US009819817B2

(12) United States Patent
Ninomiya

(10) Patent No.: US 9,819,817 B2
(45) Date of Patent: Nov. 14, 2017

(54) DISPLAY INPUT DEVICE AND METHOD OF CONTROLLING DISPLAY INPUT DEVICE

(71) Applicant: KYOCERA Document Solutions Inc., Osaka (JP)

(72) Inventor: Yuichi Ninomiya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 52 days.

(21) Appl. No.: 15/065,269

(22) Filed: Mar. 9, 2016

(65) Prior Publication Data

US 2016/0266681 A1 Sep. 15, 2016

(30) Foreign Application Priority Data

Mar. 10, 2015 (JP) .................................. 2015-047509

(51) Int. Cl.
*G06F 3/041* (2006.01)
*H04N 1/00* (2006.01)
*G06F 3/0488* (2013.01)

(52) U.S. Cl.
CPC ....... *H04N 1/00482* (2013.01); *G06F 3/0416* (2013.01); *G06F 3/04883* (2013.01); *H04N 1/00411* (2013.01); *H04N 1/00432* (2013.01); *H04N 1/00469* (2013.01); *G06F 2203/04101* (2013.01); *G06F 2203/04806* (2013.01); *H04N 2201/0094* (2013.01)

(58) Field of Classification Search
CPC . G06F 3/01; G06F 3/011; G06F 3/017; G06F 3/041–3/04897; G06F 2203/04101
See application file for complete search history.

(56) References Cited

U.S. PATENT DOCUMENTS

| 6,873,806 | B2* | 3/2005 | Kobayashi | G03G 15/5016 399/80 |
| 7,401,300 | B2* | 7/2008 | Nurmi | G06F 1/1626 345/158 |
| 8,593,415 | B2* | 11/2013 | Han | G06F 1/1694 345/173 |
| 2005/0243061 | A1* | 11/2005 | Liberty | A61B 5/1171 345/158 |
| 2006/0072009 | A1* | 4/2006 | Moesgaard Kjeldsen | G06F 3/011 348/137 |
| 2008/0059915 | A1* | 3/2008 | Boillot | G06F 3/0346 715/863 |

(Continued)

FOREIGN PATENT DOCUMENTS

JP  2014-142755 A  8/2014

*Primary Examiner* — Gene W Lee
(74) *Attorney, Agent, or Firm* — Stein IP, LLC

(57) ABSTRACT

A display input device includes: a display panel that displays an operation image; a touch panel portion that is used to detect the coordinates of a fingertip and the coordinates of an actual touch position in a close state in which the fingertip approaches the surface; and a control portion that recognizes an operation image operated by recognizing the touch position, that determines, based on the position of the fingertip in the close state and the track of the fingertip in the close state, whether or not in the close state, the fingertip is in a swing state in which the fingertip swings and that enlarges and displays, on the display panel, the operation image below the track when the fingertip is determined to be in the swing state.

12 Claims, 9 Drawing Sheets

(56) References Cited

U.S. PATENT DOCUMENTS

| | | | | |
|---|---|---|---|---|
| 2010/0090948 A1* | 4/2010 | Oba | .................... | G06F 3/0416 |
| | | | | 345/156 |
| 2013/0182902 A1* | 7/2013 | Holz | .................... | G06K 9/3233 |
| | | | | 382/103 |
| 2014/0344922 A1* | 11/2014 | Lam | .................... | G06F 21/629 |
| | | | | 726/19 |
| 2015/0177840 A1* | 6/2015 | Kankaanpaa | ........... | G06F 3/017 |
| | | | | 715/863 |
| 2016/0062452 A1* | 3/2016 | Kim | .................... | G06F 3/011 |
| | | | | 345/661 |
| 2016/0117081 A1* | 4/2016 | Pujia | .................. | G06F 3/04842 |
| | | | | 715/771 |
| 2016/0188113 A1* | 6/2016 | Alpman | ................ | G06F 3/0488 |
| | | | | 345/173 |
| 2016/0291731 A1* | 10/2016 | Liu | .................... | G06F 1/1656 |
| 2016/0320915 A1* | 11/2016 | Williamson | .......... | G06F 3/0416 |

\* cited by examiner

DISPLAY INPUT DEVICE AND METHOD OF CONTROLLING DISPLAY INPUT DEVICE

This application is based upon and claims the benefit of priority from the corresponding Japanese Patent Application No. 2015-047509 filed on Mar. 10, 2015, the entire contents of which are incorporated herein by reference.

BACKGROUND

The present disclosure relates to a display input device that receives various types settings.

There are input devices (interfaces) in which a display portion and a touch panel are combined. The display portion displays operation images for settings such as a menu, a key, a tab and a button. A user touches the display position of the operation image to perform a setting. On the display portion, a plurality of operation images may be displayed so as to be aligned, and this may cause an operation image different from a desired operation image to be erroneously touched. In order to prevent such an erroneous operation, the following technology is known.

Specifically, an information processing device is disclosed in which a touch panel is included, vibrations of the touch panel are detected, processing corresponding to a processing instruction input to the touch panel is executed, when in the detection of the vibrations, an instruction to execute specific processing whose execution results cannot be deleted is input, the execution of the specific processing is held, information that the execution is held is notified and thereafter the specific processing being held is executed when an instruction to execute the specific processing is input. This configuration is intended to reduce an erroneous operation under an environment in which vibrations are easily produced as in a running vehicle to make it difficult to perform an accurate operation on the touch panel.

In display input devices such as a multifunctional peripheral, a facsimile machine, a printer and a smartphone, an input device that includes a touch panel and a display portion may be provided so as to select a type (function) of job, to select a setting item and to set a setting value. Operation images such as a key, a tab and a button are displayed, the operation images are touched and thus it is possible to perform various types of settings. On the display portion, an explanation or a message may be displayed.

However, there are some users who have trembling fingertips (hands and arms) due to a congenital factor, a disease, an injury, a disability and the like. For example, a user who has a trembling fingertip moves their arm to attach the fingertip to a touch panel with timing at which they think the trembling fingertip overlaps a desired (target) operation image. However, the target position is not necessarily touched.

Disadvantageously, the user who has a trembling fingertip has difficulty in accurately touching (operating) the desired operation image. In particular, when operation images are densely arranged with no space therebetween or the display size of the operation image is small, an erroneous operation is more likely to be performed. When an undesired operation image is touched, it is necessary to perform an operation of correcting the erroneous operation. Hence, disadvantageously, it takes a long time for the user who has a trembling fingertip to perform a setting operation, and this may cause the user to feel irritated.

The known technology described above may be useful under conditions in which the processing device itself swings (vibrates). However, the technology is not intended for making it easy for the user who has a trembling fingertip to perform a setting. In the known technology described above, it is required to operate a key for providing an instruction to execute the specific processing. However, it is extremely difficult for the user who has a trembling fingertip to accurately operate a specific key under vibration conditions. The known technology described above does not give consideration to the user who has a trembling fingertip, with the result that it is impossible to solve the above problem.

SUMMARY

A display input device according to one aspect of the present disclosure includes a display panel, a touch panel portion and a control portion. The display panel displays an operation image for setting. The touch panel portion is provided above the display panel and detects the coordinate of a fingertip in a close state in which the surface is not touched but the fingertip approaches the surface and the coordinate of an actual touch position. The control portion recognizes a position of the fingertip in the close state and a track of the fingertip in the close state, determines, based on the recognized track, whether or not in the close state, the fingertip is in a swing state in which the fingertip swings and enlarges and displays, on the display panel, one or a plurality of the operation images displayed below the track when the fingertip is determined to be in the swing state. The "operation image" is an image, such as a key, a button, a tab, a menu or a check box, that is displayed for setting.

Further features and advantages of the present disclosure will become apparent from the description of embodiments given below.

DETAILED DESCRIPTION

With the present disclosure, it is possible for a user who has a trembling fingertip to accurately touch a desired operation image. An embodiment of the present disclosure will be described below with reference to FIGS. 1 to 11. A description will be given below using, as an example, a multifunctional peripheral 100 (which corresponds to a display input device) which is an example of a display input device 1. However, individual elements such as configurations and arrangements described in the present embodiment are not intended to limit the scope of the disclosure but are simply an illustrative example.

(Multifunctional Peripheral 100)

Figure 1:
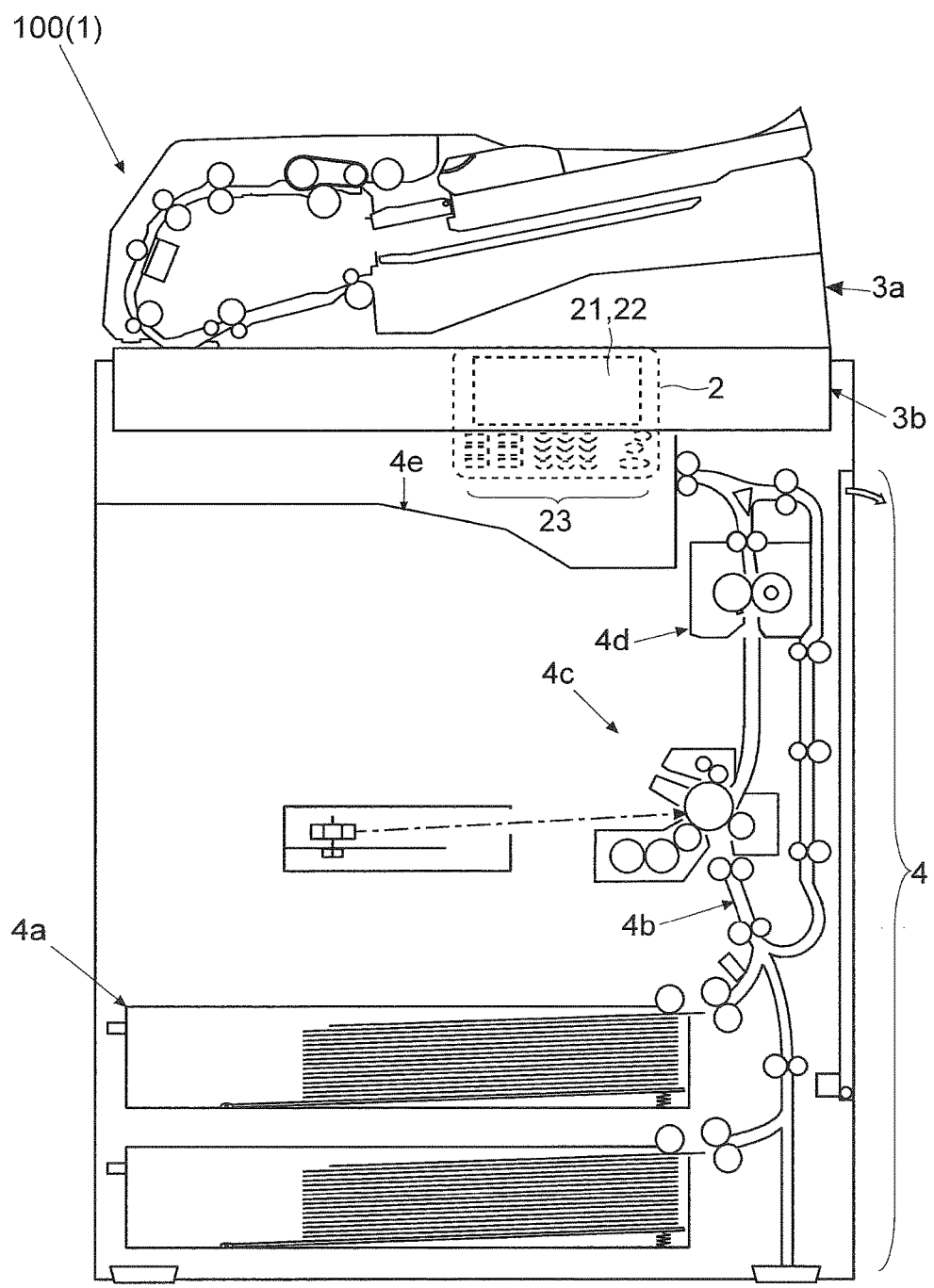
FIG. 1 is a diagram showing an example of a multifunctional peripheral according to an embodiment.

The multifunctional peripheral 100 according to the embodiment will be described with reference to FIGS. 1 and 2. As shown in FIG. 1, in the multifunctional peripheral 100 of the present embodiment, an operation panel 2 (indicated by broken lines in the figure) is provided in the front surface of the multifunctional peripheral 100. In an upper portion, an original document transport portion 3a and an image reading portion 3b are provided. Within the multifunctional peripheral 100, a print portion 4 (a paper feed portion 4a, a transport portion 4b, an image formation portion 4c and a fixing portion 4d) for performing printing is provided.

The operation panel 2 includes a display panel 21 that displays the state of the multifunctional peripheral 100, various types of messages and various types of setting screens. On the upper surface of the display panel 21, a touch panel portion 22 is provided. The touch panel portion 22 is intended for detecting the position and the coordinates of a portion in the display panel 21 that is pressed. Based on the output of the touch panel portion 22, the pressed operation image (image such as a soft key, a button, a tab or a check box) is recognized. In the operation panel 2, a plurality of hard keys 23 such as a start key and a numeric keypad are also provided.

As the touch panel portion 22, a touch panel portion is used which can detect a state in which a touch is not performed but a fingertip is moved close to the touch panel portion 22. In the multifunctional peripheral 100 (the display input device 1) of the present embodiment, as the touch panel portion 22, a capacitive type touch panel is used. The touch panel portion 22 of a type which includes a fingertip detection sensor such as an ultrasonic sensor or an optical sensor and which can detect that a fingertip is approaching the touch panel portion 22 may be adopted.

Figure 2:
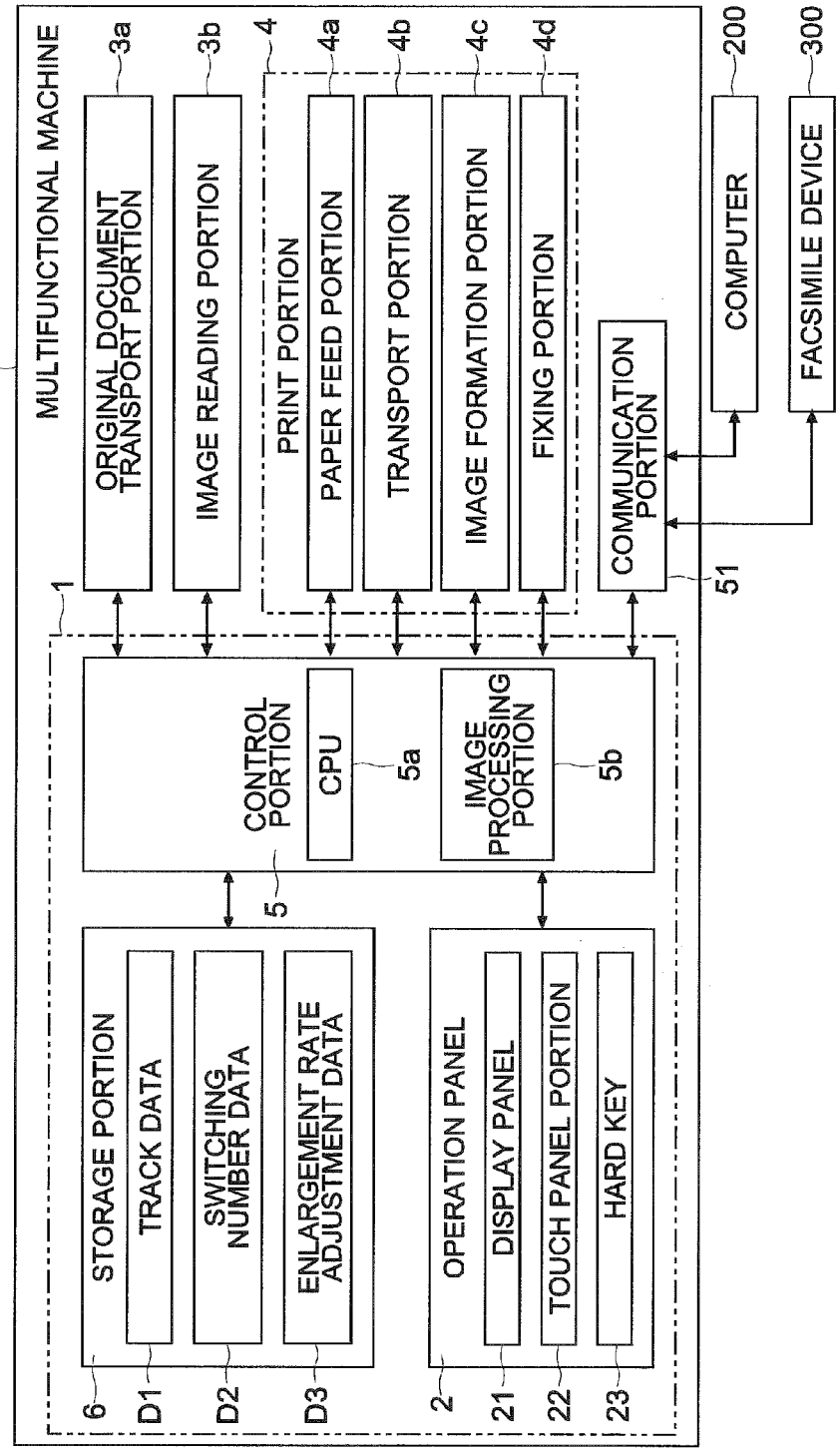
FIG. 2 is a diagram showing the example of the multifunctional peripheral according to the embodiment.

As shown in FIG. 2, within the multifunctional peripheral 100, a control portion 5 is provided. The control portion 5 controls the operations of the multifunctional peripheral 100. The control portion 5 is connected via a bus or a signal line to individual portions such as the operation panel 2, the original document transport portion 3a, the image reading portion 3b, the print portion 4 and a communication portion 51. The control portion 5 recognizes the presence of the individual portions and individual devices. The control portion 5 controls the individual portions to control the operations of the multifunctional peripheral 100 such as a scan operation and a print operation. The control portion 5 includes circuits such as a CPU 5a and an image processing portion 5b.

A storage portion 6 stores various types of programs for the control of the multifunctional peripheral 100 and various types of data such as data, setting data and image data. The control portion 5 is connected to the communication portion 51. The communication portion 51 is connected via a network, a public line or a cable to a computer 200 or a facsimile device 300 such that the communication portion 51 can communicate with them.

(Setting on Operation Panel 2)

An example of the setting in the multifunctional peripheral 100 according to the embodiment will then be described with reference to FIGS. 3 and 4.

The display panel 21 of the operation panel 2 displays various types of setting screens. The control portion 5 makes the display panel 21 switch the screens according to the operation on operation images such as a key, a button and a tab within the setting screen or the operation on the hard keys 23 arranged on the operation panel 2.

Figure 3:
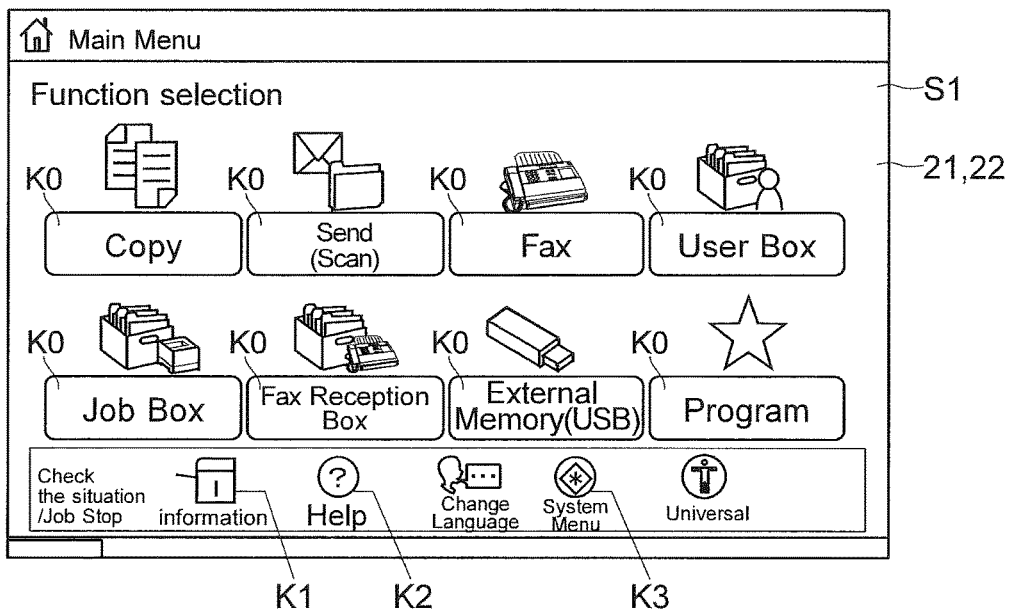
FIG. 3 is a diagram showing an example of a main menu screen according to the embodiment.
Figure 4:
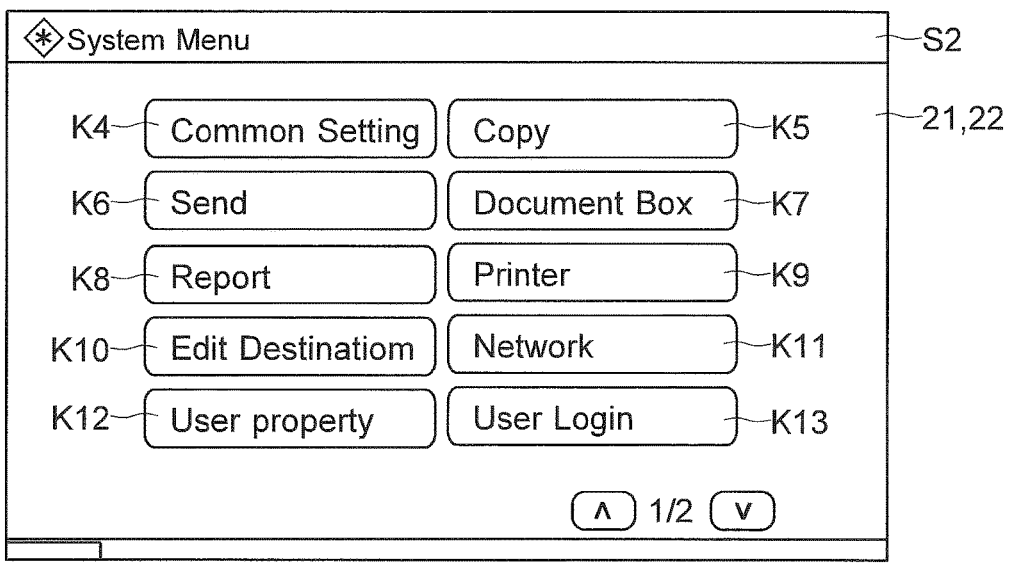
FIG. 4 is a diagram showing an example of a system menu screen according to the embodiment.

A main menu screen S1 shown in FIG. 3 is the highest screen in terms of hierarchy.

The main menu screen S1 is a screen for selecting the type of job to be executed and the category of the setting. In an upper portion of the main menu screen S1, eight job selection keys K0 are arranged to which icons (images) indicating the types of jobs that can be selected are attached. The display position of the job selection key K0 corresponding to a desired job is touched, and thus it is possible to select the type of job such as copy or scan transmission. Then, the control portion 5 displays the setting screen of the selected job on the display panel 21. In a lower portion of the main menu screen S1, a system related key group on a system setting (a setting related to the overall operation of the multifunctional peripheral 100 and a setting which is not accompanied by the execution of a job) is arranged.

The device information ion key K1 of the system related key group is operated, and thus it is possible to check the remaining amount of toner and the remaining number of sheets. The help icon key K2 is operated, and thus it is possible to display a help screen in which an operation method is explained.

Figure 7:
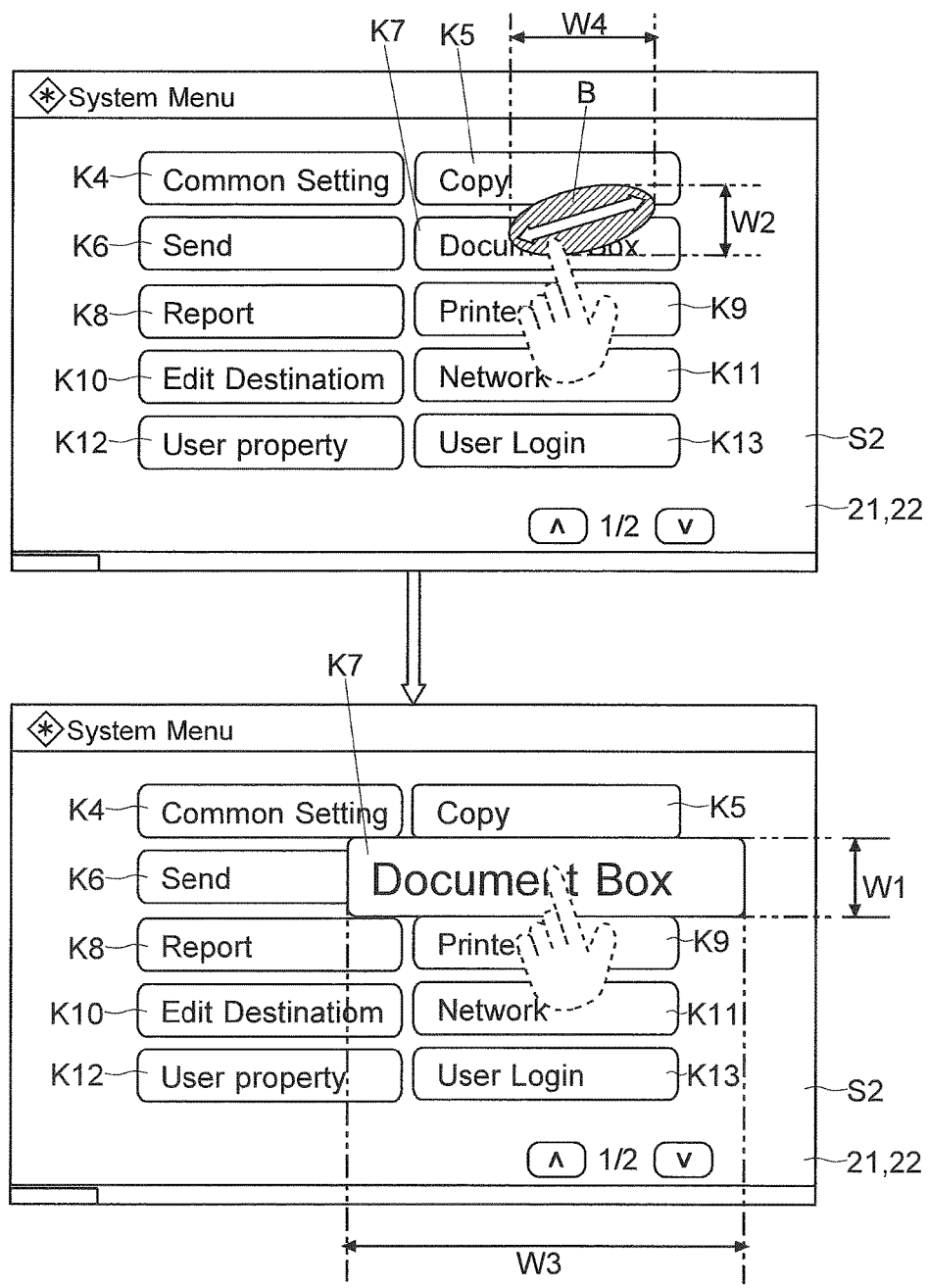
FIG. 7 is a diagram showing an example of a case where one of operation images is enlarged and displayed.

The system menu key K3 of the system related key group is operated, and thus the control portion 54 displays a system menu screen S2 on a display portion 11 (see FIG. 7). The system menu screen S2 is a screen for setting basic operations (behaviors and initial setting values) of the multifunctional peripheral 100.

In the system menu screen S2, a plurality of system item keys K4 to K13 are arranged. The system item keys K4 to K13 include terms that indicate the categories of the system setting. The system item key K4 of a "Common Setting" is operated, and thus it is possible to perform settings that are applied in common to individual functions, such as the setting of a screen which is first displayed when power is turned on, the setting of a notification sound when the operation panel 2 is operated (the operation panel 2 includes an unillustrated speaker) and the limitation of the number of sheets that can be printed at a time. The system item key K5 of a "Copy" is operated, and thus it is possible to determine basic (default) behaviors on the copy function, such as whether or not the magnification is automatically changed when an original document whose size is different from that of the sheet stored is received. The system item key K11 of a "Network" is operated, and thus it is possible to perform settings on the network, such as the IP address of the multifunctional peripheral 100 and a subnet mask. The description of details that can be set by the system item keys other than those described above will be omitted.

(Display Input Device 1)

Figure 5:
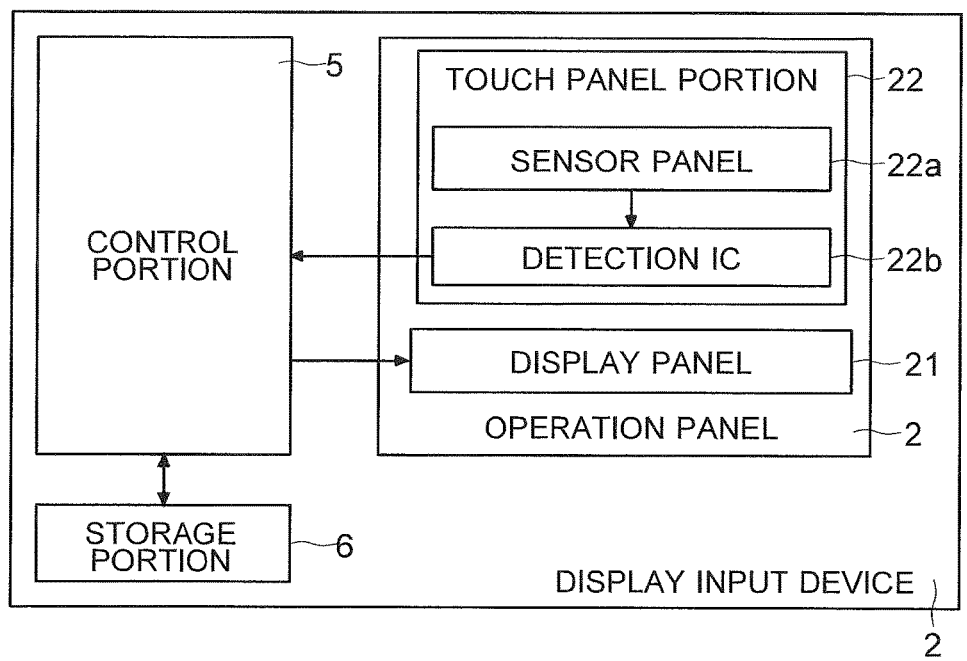
FIG. 5 is a diagram showing an example of a display input device according to the embodiment.

The display input device 1 according to the embodiment will then be described with reference to FIG. 5.

In the multifunctional peripheral 100, the display input device 1 is incorporated. The display input device 1 includes the operation panel 2 (the display panel 21 and the touch panel portion 22), the control portion 5 and the storage portion 6. In the display input device 1, that is, the multifunctional peripheral 100, various types of settings can be performed while the screen is being seen.

The display panel 21 displays the setting screens and the operation images. The control portion 5 controls the display of the display panel 21. The touch panel portion 22 is provided above the display panel 21. The control portion 5 detects a touch position (coordinates) based on the output of the touch panel portion 22. As shown in FIG. 5, the touch panel portion 22 includes a sensor panel 22a. The sensor panel 22a includes transparent electrodes that are patterned. A protective film or a cover may be attached to the sensor panel 22a. The sensor panel 22a is capacitive type sensor panel. The touch panel portion 22 includes a detection IC 22b that detects a variation in capacitance on the surface and that detects the touch position based on the position of the electrode whose capacitance is varied. The detection IC 22b detects a variation in the capacitance of each electrode with a predetermined sampling rate. The detection IC 22b determines whether the amount of variation in the capacitance of any one of the electrodes in the sensor panel 22a is in a touch state and detects, when it falls within a predetermined range of values, the coordinates (position) of the touch position based on the position of the electrode whose capacitance is varied. The detection IC 22b may be provided on the side of the control portion 5.

The output (the result of the detection) of the detection IC 22b is input to the control portion 5. The control portion 5 recognizes the touch position(coordinates) based on the output of the detection IC 22b of the touch panel portion 22. The control portion 5 recognizes that an operation image which overlaps (is displayed on) the touch position (coordinates) is operated. Then, the control portion 5 displays, on the display panel 21, the screen corresponding to the operation image that is operated.

The detection IC 22b can detect a variation in capacitance that is lower than that at the time of touch. In other words, the detection sensitivity of the sensor panel 22a and the detection IC 22b is high. Hence, the detection IC 22b detects, based on the position of the electrode where a variation in capacitance lower than that at the time of touch is produced, the position (coordinates) of a fingertip in a state in which the surface is not touched but the fingertip approaches the surface of the sensor panel 22a, that is, in a close state in which the fingertip is closer to the sensor panel 22a than a detectable distance. In other words, the detection IC 22b detects the coordinates of the fingertip in the close state when the amount of variation in the capacitance of any one of the electrodes in the sensor panel 22a falls within a range of values which are determined to be in the close state, that is, in the range of predetermined values.

The control portion 5 receives a notification from the detection IC 22b. Hence, the control portion 5 can recognize, based on the output of the touch panel portion 22, the close state in which the surface is not touched but the fingertip approaches the surface and the coordinates (position) of the fingertip in the close state. Although the size and the thickness of the finger vary between individuals, even in a state in which the finger is about one to a few centimeters away from the touch panel portion 22, it is possible to detect and recognize the coordinates of the fingertip. While being in the close state, the detection IC 22b continues to notify the position (coordinates) of the fingertip to the control portion 5. In this way, the control portion 5 recognizes a movement path (track) of the coordinates (position) of the fingertip in the close state. The storage portion 6 stores track data D1 (data indicating the movement progress of the fingertip (coordinates) in the screen being displayed; see FIG. 2).

(Determination of Swing State)

An example of a method of determining a swing state in the display input device 1 according to the embodiment will then be described The control portion 5 determines whether or not in the close state, the fingertip is in a swing state in which the fingertip swings. The control portion 5 of the present embodiment determines, based on the recognized track of the fingertip in the close state, whether or not the fingertip is in the swing state.

When the user has a trembling fingertip, the fingertip may be moved so as to reciprocate. The movement of the fingertip caused by the trembling is characterized in that the direction of the movement of the fingertip is often changed and that the direction of the movement of the fingertip is changed at an angle of about 180 degrees.

Hence, the control portion 5 references the track data D1 in the present display screen, and determines that the fingertip is in the swing state when the number of times the direction of the movement of the fingertip is switched within a predetermined determination period is more than a predetermined reference number. With consideration given to the reciprocation movement, the control portion 5 counts, in the switching of the direction of the movement of the fingertip in the close state, only the switching of the direction of the movement in which a variation in the angle in the direction of the movement falls within a predetermined range of angles (for example, more than 90 degrees but less than 270 degrees), with the result that a count value and the reference number may be compared with each other.

The determination period can be determined as necessary. For example, the determination period can be set to a period in which to go back only a predetermined time from the present time (time when whether or not the fingertip is in the swing state is determined). The predetermined time can be set to 1 to 5 seconds, and more preferably about 3 seconds. The reference number can also be determined as necessary. For example, the reference number can be determined to be about 3 to 15. For example, the control portion 5 determines that the fingertip is in the swing state when the fingertip is reciprocated about 10 times in 3 seconds. In other words, the control portion 5 automatically recognizes that the fingertip of the user who performs the operation trembles.

When the fingertip trembles, the movement distance of the fingertip from a changing point of the direction of the movement to a changing point may be short as compared with a flick operation or the like, and the swing width may be substantially constant. Hence, the control portion 5 references the track data D1 and individually determines the distance (distance from the changing point of the direction of the movement to the changing point) from the switching of the direction of the movement of the fingertip to the subsequent switching. Then, the control portion 5 may use, as one of the conditions for determining that the fingertip is in the swing state, a fact that the absolute value of a difference between the individually determined distance and a distance in the preceding switching is equal to or less than a predetermined allowance value.

When the fingertip trembles, the region of the track (region that connects the outer circumferences of the changing points of the direction of the movement within the determination period) may be elongated, and its area may be prevented from being excessively large. Hence, the control portion 5 may use, as one of the conditions for determining that the fingertip is in the swing state, a fact that the area of a figure (the number of dots within the figure) connecting the outer circumferences of the coordinates of the switching points of the direction of the movement within the determination period is determined and that the determined area falls within a predetermined reference area.

Then, the control portion 5 determines that the fingertip is in the swing state when one of the conditions described above or a plurality thereof are satisfied. The control portion 5 periodically checks the track data D1 to check whether or not the movement of the fingertip in the determination period (period in which to go back only a predetermined time from the present time) satisfies the conditions for determining that the fingertip is in the swing state. Then, the control portion 5 determines that the fingertip is in the swing state when it is determined that the determination conditions are satisfied.

Then, when the control portion 5 determines that the fingertip is in the swing state, the control portion 5 enlarges and displays the operation image for the user who has a trembling fingertip. Specifically, the control portion 5 enlarges and displays part or all of the operation image overlapping (located below) the track of the fingertip in the close state within a predetermined period. In this way, the operation image that the user is highly likely to desire to operate is enlarged and displayed.

(Aspect of Enlargement and Display)

An example of the enlargement and display of the operation image in the swing state in the display input device 1 according to the embodiment will then be described with reference to FIGS. 6 to 10.

Figure 6:
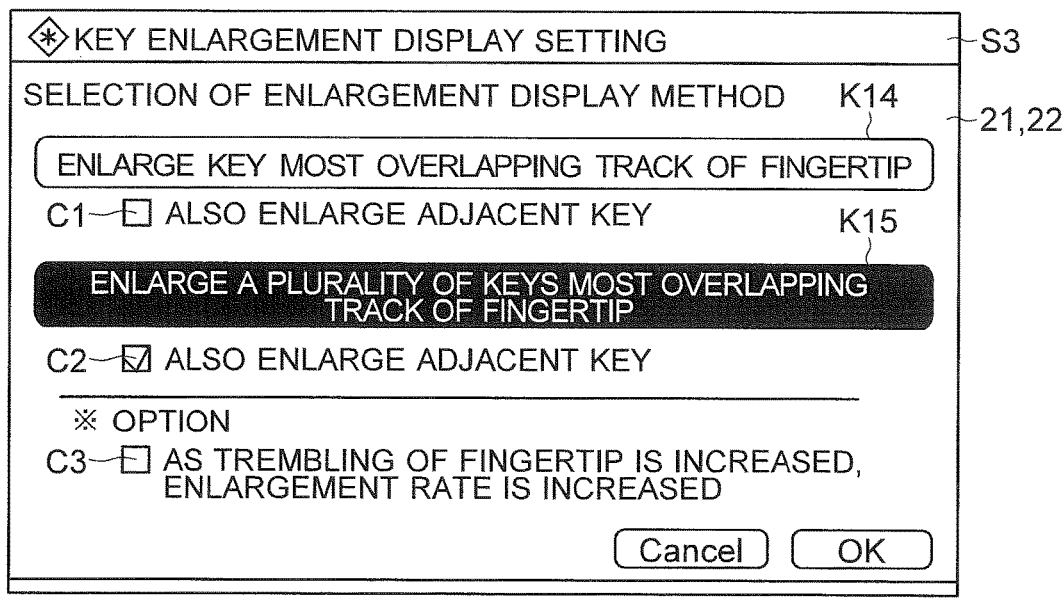
FIG. 6 is a diagram showing an example of an enlargement display setting screen according to the embodiment.

In the display input device 1 of the present embodiment, it is possible to previously determine, with the enlargement display setting screen S3 of FIG. 6, which one of the operation images within the screen is enlarged and displayed when the swing state is detected. The enlargement display setting screen S3 can be displayed by performing a predetermined operation on the operation panel 2.

In the enlargement display setting screen S3, a first mode key K14 and a second mode key K15 are displayed. Either of the first mode key K14 and the second mode key K15 is selected.

The first mode key K14 corresponds to a first mode in which an operation image (first mode enlargement target image) where the time during which the fingertip is thereabove within a predetermined period is the longest is enlarged and displayed on the display panel 21. When it is desired to enlarge and display the operation image in the first mode, the first mode key K14 is operated (see FIG. 6).

The predetermined period can be determined as necessary. The predetermined period can be set to a period until the fingertip is determined to be in the swing state after the display of the present display screen or can be set to the determination period described above (the same is true in the following description).

The second mode key K15 corresponds to a second mode in which a plurality of operation images (second mode enlargement target images) displayed below the track within the predetermined period are enlarged and displayed on the display panel 21. When it is desired to enlarge and display the operation images in the second mode, the second mode key K15 is operated (see FIG. 6).

When the fingertip is moved above a plurality of keys, in the second mode, a plurality of operation images are enlarged. When the first mode is selected, as compared with the case where the second mode is selected, the number of operation images which are enlarged is basically decreased. By contrast, when the second mode is selected, as compared with the case where the first mode is selected, the number of operation images which are enlarged is basically increased.

Below the first mode key K14, a first check box C1 is provided. When the first check box C1 is checked, the control portion 5 enlarges and displays, on the display panel 21, together with the first mode enlargement target image, the operation image adjacent to the first mode enlargement target image. When the first check box C1 is not checked, only one operation image (the first mode enlargement target image) is enlarged and displayed on the display panel 21, and the display size of the operation image adjacent to the first mode enlargement target image is not changed.

Below the second mode key K15, a second check box C2 is provided. When the second check box C2 is checked, the control portion 5 enlarges and displays, on the display panel 21, together with the second mode enlargement target image, the operation image adjacent to the second mode enlargement target image. When the second check box C2 is not checked, only the second mode enlargement target image is enlarged and displayed, and the display size of the operation image adjacent to the second mode enlargement target image is not changed.

As described above, in the display input device 1, which one of the operation images within the display screen is enlarged and displayed can be determined by the user. The aspect of the actual enlargement and display of the operation image will be described below. An example when the operation image is enlarged and displayed in the system menu screen S2 (see FIG. 4) will be described below (likewise, in the main menu screen S1, the operation image is enlarged and displayed).

(First Mode)

An example where in the first mode, the operation image is enlarged and displayed when the operation image adjacent thereto is not enlarged (when the first check box C1 is not checked) will first be described with reference to FIG. 7.

The figure in the upper portion of FIG. 7 shows a state before the control portion 5 determines that the fingertip is in the swing state. As an example of the screen displayed, the system menu screen S2 is used. In other words, the operation image is not enlarged and displayed, and a normal display state of the system menu screen S2 is shown. The figure in the upper portion of FIG. 7 shows that the fingertip of the user swings above the system item key K5 of the "Copy" and the system item key K7 of a "Document Box". In the figure in the upper portion of FIG. 7, an example of the position of the fingertip (hand) in the close state is indicated by a hand-shaped broken-line figure. An example of the direction in which the fingertip swings is indicated by a framed white arrow.

When the control portion 5 determines that the fingertip is in the swing state, the control portion 5 enlarges and displays, on the display panel 21, an operation image (the first mode enlargement target image) where the time during which the fingertip is thereabove within the predetermined period is the longest. The figure in the lower portion of FIG. 7 shows an example where the system item key K7 of the "Document Box" is enlarged and displayed as the first mode enlargement target image.

Since the operation image is enlarged, even when the fingertip trembles, it is possible to easily touch the interior of the region of the operation image. When the region within the enlarged operation image is touched, the control portion 5 recognizes that the enlarged operation image is operated, and displays, on the display panel 21, a screen corresponding to the enlarged operation image.

(Second Mode)

An example where in the second mode, the operation image is enlarged and displayed when the operation image adjacent thereto is not enlarged (when the second check box C2 is not checked) will then be described with reference to FIG. 8.

Figure 8:
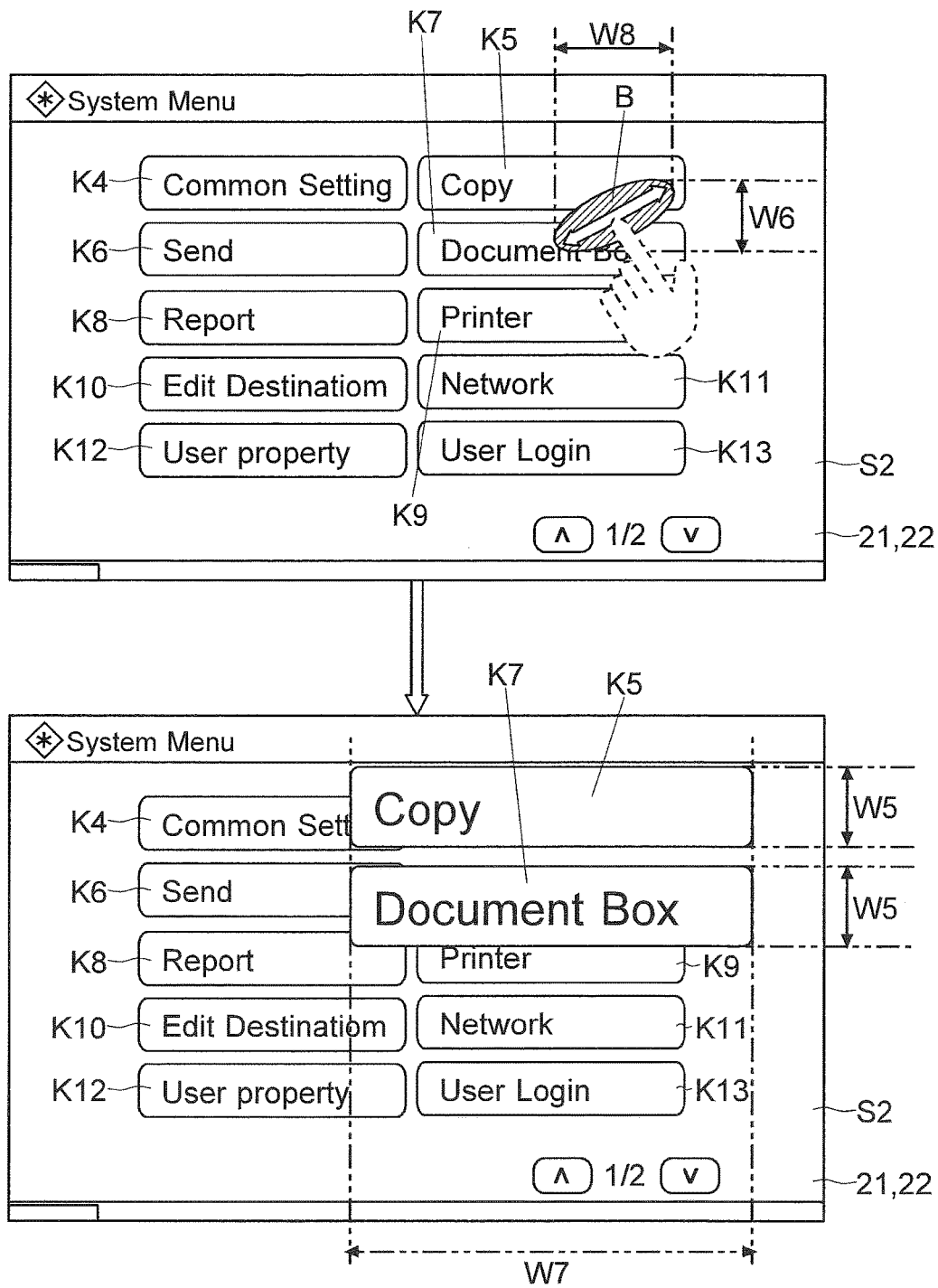
FIG. 8 is a diagram showing an example of a case where a plurality of operation images are enlarged and displayed.

The figure in the upper portion of FIG. 8 shows a state before the control portion 5 determines that the fingertip is in the swing state. As an example of the screen displayed, the system menu screen S2 is used. In other words, the operation image is not enlarged and displayed, and the normal display state of the system menu screen S2 is shown. The figure in the upper portion of FIG. 8 shows that the fingertip of the user swings above the system item key K5 of the "Copy" and the system item key K7 of a "Document Box". In the figure in the upper portion of FIG. 8, an example of the position of the fingertip (hand) in the close state is indicated by a hand-shaped broken-line figure. An example of the direction in which the fingertip swings is indicated by a framed white arrow.

When the control portion 5 determines that the fingertip is in the swing state, the control portion 5 enlarges and displays, while displaying the display screen (the system menu screen S2 in the example of FIG. 8), on the display panel 21, the operation image (the second mode enlargement target image) displayed immediately below the track of the fingertip within the predetermined period.

When a plurality of operation images located immediately below the track of the fingertip in the close state within the predetermined period are present, all of them may be enlarged and displayed or only part thereof may be enlarged and displayed. The maximum number of operation images that are enlarged and displayed is previously determined, and when the number of operation images located immediately below the track is equal to or less than the maximum number, the control portion 5 enlarges and displays all of the operation images on the display panel 21. When the number of operation images located immediately below the track exceeds the maximum number, the number of operation images that are enlarged and displayed by the control portion 5 may be limited to the maximum number of operation images. In this case, it is possible to determine, as necessary, what operation images are enlarged. For example, the control portion 5 selects, enlarges and displays, as the second mode enlargement target images, up to the maximum number of operation images among the operation images located immediately below the track, in decreasing order of the time during which the fingertip is present thereabove.

The figure in the lower portion of FIG. 8 shows an example of the state in which all the operation images located immediately below the track are enlarged and displayed. The figure in the lower portion of FIG. 8 shows an example where the system item key K5 of the "Copy" and the system item key K7 of the "Document Box" are enlarged and displayed.

A plurality of operation images overlapping the track are highly likely to include the operation image that the user desires to operate. In this way, it is possible to enlarge and display only the operation panel that the user is highly likely to desire to operate.

(Enlargement of Adjacent Operation Images)

Enlargement of operation images (hereinafter referred to as "adjacent operation images") adjacent to the first mode enlargement target image or the second mode enlargement target image will then be described with reference to FIGS. 9 and 10.

Figure 9:
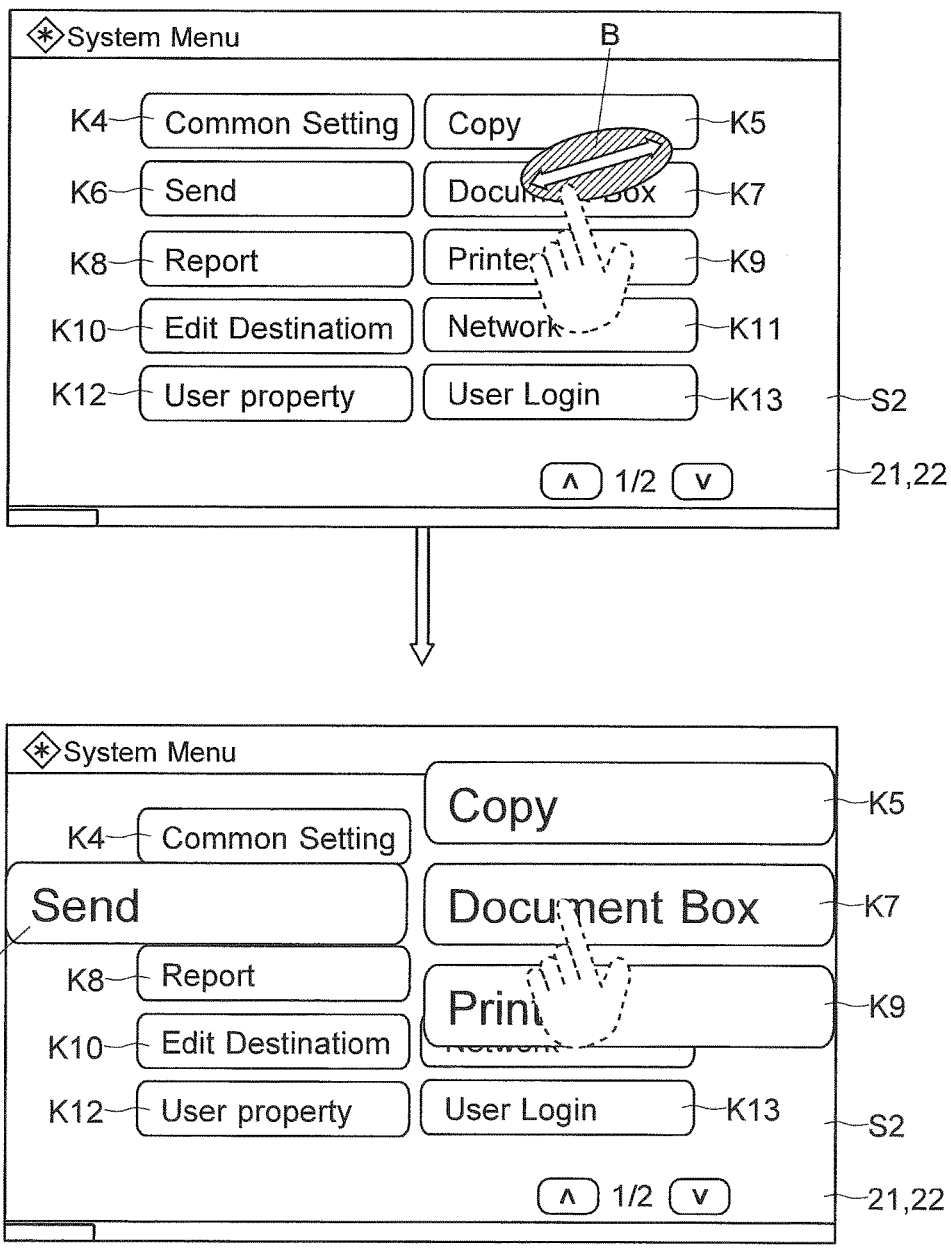
FIG. 9 is a diagram showing an example of a case where an operation image located immediately below the track of a fingertip and operation images adjacent thereto in a first mode are enlarged and displayed.
Figure 10:
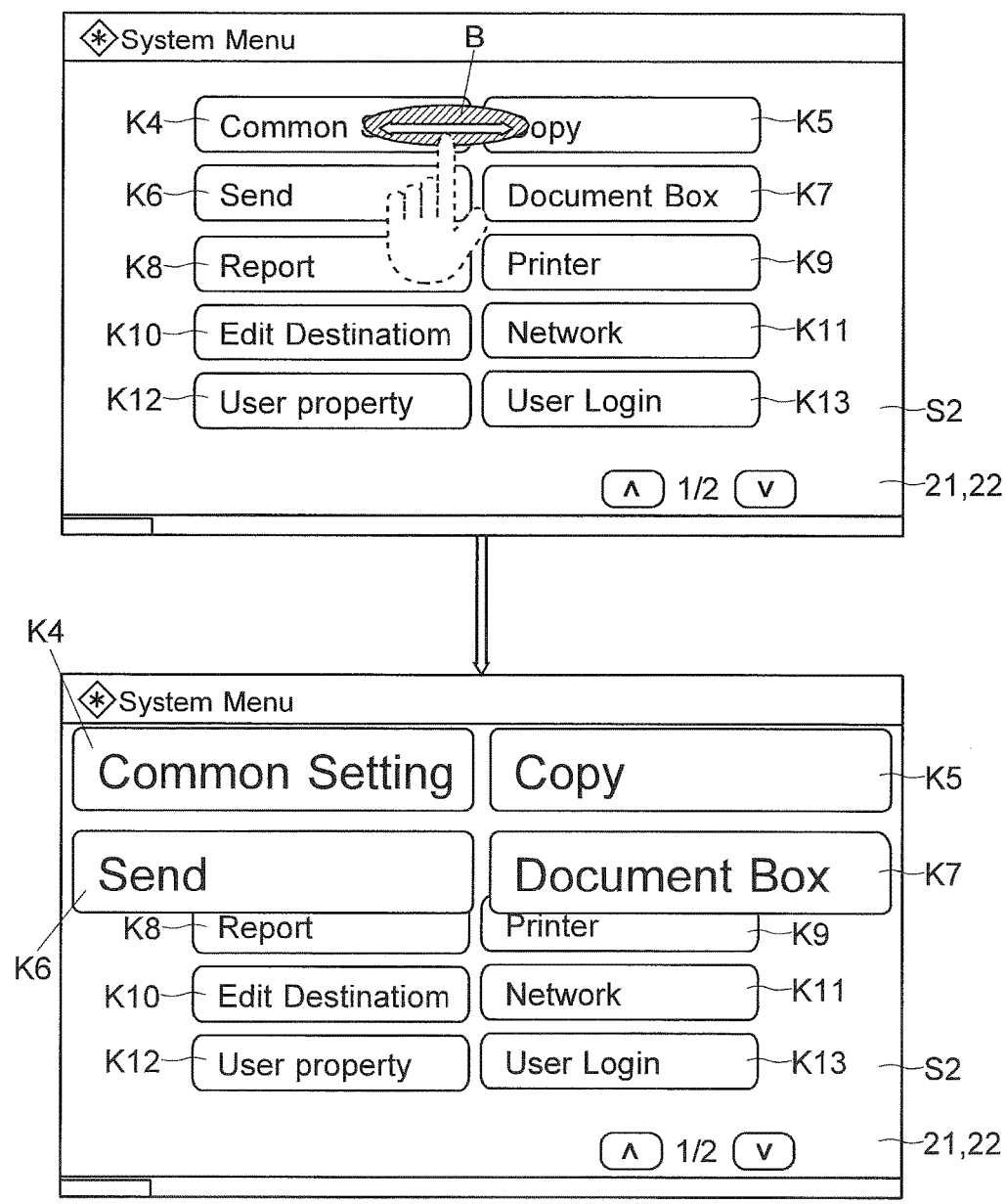
FIG. 10 is a diagram showing an example of a case where the operation image located immediately below the track of the fingertip and operation images adjacent thereto in a second mode are enlarged and displayed.

The figures in the upper portion of FIGS. 9 and 10 show a state before the control portion 5 determines that the fingertip is in the swing state. As an example of the screen displayed, the system menu screen S2 is used. In other words, the operation image is not enlarged and displayed, and the normal display state of the system menu screen S2 is shown.

The figure in the upper portion of FIG. 9 shows that the fingertip of the user swings above the system item key K5 of the "Copy" and the system item key K7 of the "Document Box". In the figure in the upper portion of FIG. 9, an example of the position of the fingertip (hand) in the close state is indicated by a hand-shaped broken-line figure. An example of the direction in which the fingertip swings is indicated by a framed white arrow.

As shown in the figure in the lower portion of FIG. 9, when the first check box C1 is checked, the control portion 5 enlarges and displays, on the display panel 21, the first mode enlargement target image (the operation image where the time during which the fingertip stays thereabove within the predetermined period is the longest) and the operation images adjacent to the first mode enlargement target image.

In the example of FIG. 9, the operation image where the time during which the fingertip stays thereabove is the longest is the system item key K7 of the "Document Box". FIG. 9 shows the state in which the system item key K5 of the "Copy", the system item key K6 of a "Send" and the system item key K9 of a "Printer" adjacent to the "Document Box" in the up/down direction and in the left/right direction are enlarged. The system item key K4 of the "Common Setting" and the system item key K8 of a "Report" obliquely adjacent thereto may be enlarged and displayed.

The figure in the lower portion of FIG. 10 shows an example of a case where the operation images adjacent to the second mode enlargement target image are also enlarged and displayed (an example of a case where the second check box C2 is checked). The figure in the lower portion of FIG. 10 shows an example where the control portion 5 enlarges and displays, on the display panel 21, the operation images (the second mode enlargement target images) overlapping the track when seen from above and the operations adjacent thereto.

The figure in the upper portion of FIG. 10 shows that the fingertip of the user swings above the system item key K4 of the "Common Setting" and the system item key K5 of the "Copy". In the figure in the upper portion of FIG. 10, an example of the position of the fingertip (hand) in the close state is indicated by a hand-shaped broken-line figure. An example of the direction in which the fingertip swings is indicated by a framed white arrow.

In the example of FIG. 10, the operation images overlapping the track are the system item key K4 of the "Common Setting" and the system item key K5 of the "Copy". The figure in the lower portion of FIG. 10 shows the state in which the system item key K6 of the "Send" and the system item key K7 of the "Document Box" adjacent to the system item key K4 of the "Common Setting" and the system item key K5 of the "Copy" in the up/down direction or in the left/right direction are enlarged.

As described above, the operation images adjacent to the operation image located below the track of the fingertip in the close state are also enlarged, and thus the operation images enlarged and displayed include the key that the user desires to operate almost without fail. Hence, even when the fingertip trembles, the user can touch the desired operation image without fail.

(Enlargement Rate of Operation Image)

Figure 11:
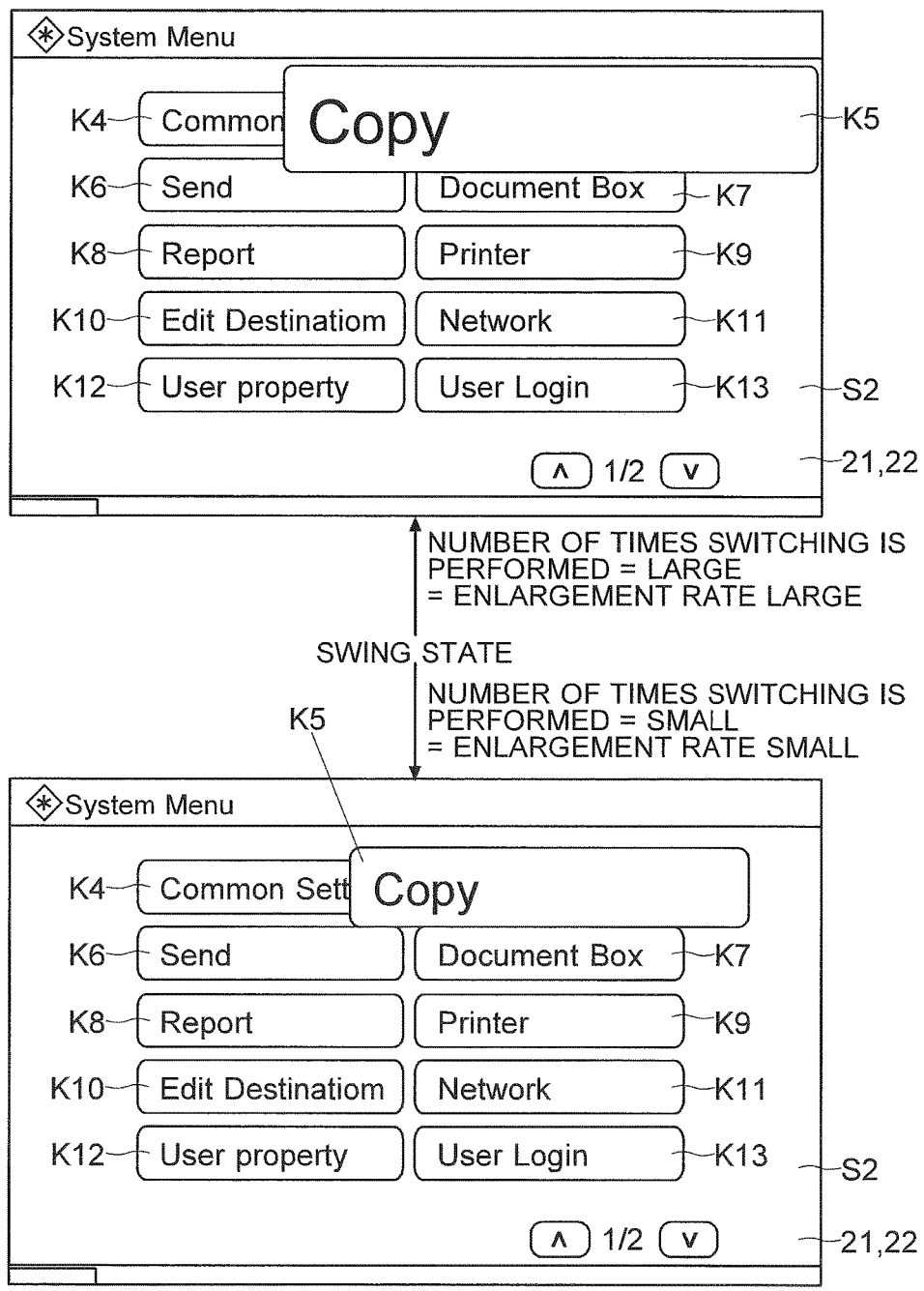
FIG. 11 is a diagram showing an example of a case where an enlargement rate is changed according to the number of times the direction of movement of the fingertip is switched.

An enlargement rate in the enlargement of the operation image according to the embodiment will then be described with reference to FIGS. 7, 8 and 11. FIG. 11 is a diagram showing an example of a case where an enlargement rate is changed according to the number of times the direction of the movement of the fingertip is switched.

It is possible to determine, as necessary, to what degree the operation image is enlarged. The control portion 5 may apply a predetermined fixed enlargement rate (for example, any value between 120 and 300%), enlarge the operation image in the up/down direction and in the left/right direction only by the fixed enlargement rate and thereby enlarge and display the operation image.

As the number of times the direction of the movement of the fingertip is switched in the close state in the predetermined period is increased, the control portion 5 may increase the enlargement rate in the enlargement and display. When the fingertip trembles significantly, the number of times the switching is performed is increased. When the fingertip trembles significantly, a large number of users have difficulty in performing accurate touching. Hence, when the control portion 5 recognizes that the fingertip trembles significantly, the control portion 5 may apply a high enlargement rate among a plurality of types of fixed enlargement rates to enlarge the width of the operation image in the up/down direction and the width in the left/right direction by the applied enlargement rate.

In this case, the enlargement rates corresponding to the number of times the direction of the movement of the fingertip is switched are stored as data (switching number data D2) in the storage portion 6 (see FIG. 2). In the switching number data D2, as the number of times the switching is performed is increased, a higher enlargement rate is defined. In this case, the control portion 5 determines the enlargement rate based on the actually counted number of times the switching is performed and the switching number data D2.

In the display input device 1, with a third check box C3 provided in the enlargement display setting screen S3, it is possible to set whether or not the enlargement rate is increased as the fingertip trembles more significantly. When the third check box C3 is not checked, the control portion applies the predetermined fixed enlargement rate to enlarge and display the operation image. On the other hand, when the third check box C3 is checked, the control portion determines the enlargement rate based on the counted number of times the switching is performed and the switching number data D2.

The display input device 1 may determine the enlargement rate according to the breadth of the range of the track of the fingertip in the close state. In this case, the control portion 5 determines the swing range B of the fingertip based on the track. Then, the control portion 5 enlarges and displays the operation image on the display panel 21 such that the width of the operation image after being enlarged and displayed in the up/down direction is wider than the width of the determined swing range B in the up/down direction and that the width of the operation image after being enlarged and displayed in the left/right direction is wider than the width of the determined swing range B in the left/right direction.

The control portion 5 first checks the original size (the number of dots in each of the up/down direction and the left/right direction) of the operation image to be enlarged and displayed. The control portion 5 determines the swing range B and checks the width (the number of dots) of the swing range in the up/down direction and the width in the left/right direction. Here, the swing range B can be determined as necessary.

For example, the control portion 5 determines that the range (range connecting the outer circumferential edges of the track) of the track of the fingertip in the close state until the time when the fingertip is determined to be in the swing state after a specific time (the start point of the determination period or any time after the start of the determination period) is the swing range B. The specific time can be determined as necessary. For example, the time at which to go back about a half of the determination period since the time when the fingertip is determined to be in the swing state may be set to the specific time. In FIGS. 7, 8, 9 and 10, an example of the swing range B determined by the control portion 5 is indicated by a shaded ellipse.

Then, the control portion 5 checks whether or not the width of the operation image to be enlarged and displayed in the up/down direction is narrower than the width of the swing range B in the up/down direction. The control portion 5 also checks whether or not the width of the operation image to be enlarged and displayed in the left/right direction is narrower than the width of the swing range B in the left/right direction. When the width in the left/right direction is not narrow but the width in the up/down direction is narrow, the control portion 5 determines a magnification necessary for making the width of the operation image in the up/down direction equal to the width of the swing range B in the up/down direction. When the width in the up/down direction is not narrow but the width in the left/right direction is narrow, the control portion 5 determines a magnification necessary for making the width of the operation image in the left/right direction equal to the width of the swing range B in the left/right direction. When both the width in the up/down direction and the width in the left/right direction are narrow, the control portion 5 determines a magnification necessary for making the width of the operation image equal to the width of the swing range B in the direction in which the difference between the widths is larger.

Then, the control portion 5 adds an adjustment value to the determined magnification to determine the final enlargement rate to be applied. The adjustment value is a value that serves as a margin for making the area of the operation image after being enlarged wider than the swing range B in a reliable manner. Then, the control portion 5 displays, on the display panel 21, the operation image whose widths in the up/down direction and the left/right direction are widen only by the final enlargement rate.

In the example shown in FIG. 7, the width W1 of the enlarged system item key K7 in the up/down direction is wider than the width W2 of the swing range B (the range of the track of the fingertip in the close state) in the up/down direction. The width W3 of the enlarged system item key K7 in the left/right direction is also wider than the width W4 of the swing range B in the left/right direction. In the example shown in FIG. 8, the width W5 of the enlarged system item keys K5 and K7 in the up/down direction is wider than the width W6 of the swing range B in the up/down direction. The width W7 of the enlarged system item keys K5 and K7 in the left/right direction is also wider than the width W8 of the swing range B in the left/right direction. As described above, the width of the operation image after being enlarged and displayed in the up/down direction is made wider than the width of the swing range B in the up/down direction, and the width in the left/right direction is also made wider than the width of the swing range B in the left/right direction.

The adjustment value may be changed such that as the number of times the direction of the movement of the fingertip is switched is increased, the enlargement rate is increased. The storage portion 6 may store enlargement rate adjustment data D3 that determines the adjustment value for the number of times the direction of the movement of the fingertip is switched within the predetermined period in the close state (see FIG. 2). In the enlargement rate adjustment data D3, as the number of times the switching is performed is increased, a higher adjustment value is defined whereas as the number of times the switching is performed is decreased, a lower adjustment value is defined. Then, the control portion 5 adds the adjustment value obtained based on the enlargement rate adjustment data D3 to the magnification (the higher magnification of the magnification in the up/down direction and the magnification in the left/right direction) determined based on the swing range B, and thereby determines the enlargement rate to be applied to the enlargement and display. In this way, as the number of times the switching is performed is increased, the enlargement rate of the operation image can be increased.

In a case where the enlargement rate is determined according to the breadth of the swing range B, when the third check box C3 is not checked, the control portion adds the predetermined fixed adjustment value to the determined magnification to determine the enlargement rate to be applied to the enlargement and display. On the other hand, when the third check box C3 is checked, the control portion 5 determines the adjustment value corresponding to the number of times the switching is performed based on the number of times the switching is performed and the enlargement rate adjustment data D3, and adds the determined adjustment value to the determined magnification to determine the enlargement rate to be applied to the enlargement and display.

(Completion of Enlargement and Display of Operation Image)

The completion of the enlargement and display of the operation image will then be described. In the display input device 1 of the present embodiment, with consideration given to the user who has a trembling fingertip, the operation image which may be desired to operate is enlarged and displayed. However, the operation image which the user does not desire to operate may be enlarged and displayed. Part or all of the operation image which is desired to operate is covered by the enlarged operation image, with the result that it may be difficult to perform the operation. Hence, in the display input device 1 of the present embodiment, it is possible to easily cancel the enlargement and display of the operation image.

Specifically, the user preferably separates the finger from the touch panel portion 22 such that the close state is prevented from being detected. In other words, the finger is preferably separated such that the control portion 5 cannot detect the position of the fingertip. Then, when a predetermined cancellation time has elapsed since the position of the fingertip cannot be detected by the control portion 5, the control portion 5 cancels the enlargement and display of the operation image, and displays, on the display panel 21, the normal screen in which the operation image is not enlarged and displayed (returns to the state indicated by the upper portion of FIGS. 7 to 10).

The user who has a trembling fingertip often brings the finger close to the touch panel portion 22 in order to touch the desired operation image such as the key, the tab, the button or the menu. Then, the user attempts to attach the fingertip to the touch panel portion 22 with timing at which the trembling fingertip overlaps the desired operation image. However the user may fail to do so and touch an undesired operation image.

Hence, the display input device 1 includes at least the display panel 21, the touch panel portion 22 and the control portion 5. The display panel 21 displays an operation image for setting (image, such as the key, the button, the tab, the menu or the check box, that is displayed for setting). The touch panel portion 22 is provided above the display panel 21, and is used to detect the coordinates of the fingertip in the close state in which the surface is not touched but the fingertip approaches the surface and the coordinates of the touch position. The control portion 5 recognizes the operation image operated by recognizing the touch position based on the detection of the coordinates by the touch panel portion 22, recognizes the position of the fingertip in the close state and the track of the fingertip in the close state, determines, based on the recognized track, whether or not the fingertip is in the swing state in which the fingertip swings in the close state and enlarges and displays, on the display panel 21, one or a plurality of operation images displayed below the track when the fingertip is determined to be in the swing state.

The control portion 5 recognizes that the state in which the user who has a trembling fingertip brings the finger close to the touch panel portion 22 in order to touch the operation image is the swing state. In other words, the control portion 5 automatically recognizes that the user who has a trembling fingertip performs the operation. Then, at the time of the state (the swing state) in which the user who has a trembling fingertip attempts to perform the operation, the operation image which is estimated to be touched by the user is enlarged and displayed. In this way, the operation on the desired operation image by the user who has a trembling fingertip is easily performed, and it is possible to operate the desired operation image without fail. It is also possible to more shorten the time necessary for the setting by the user who has a trembling fingertip, and thus it is possible to significantly reduce botheration on the setting.

A user who does not have a trembling fingertip normally moves the fingertip straight toward the target operation image. On the other hand, in the case of the user who has a trembling fingertip, the direction of the movement of the fingertip in the close state is often periodically switched or the fingertip is often moved back and forth in the same range (section). Hence, when the number of times the direction of the movement of the fingertip in the close state within the predetermined determination period is more than the predetermined reference number, the control portion 5 determines that the fingertip is in the swing state. In this way, it is possible to accurately determine, based on the tendency of the movement of the fingertip in the close state, whether or not the fingertip is in the swing state (whether or not the user who has a trembling fingertip performs the operation).

The control portion 5 may enlarge and display, on the display panel 21, the operation image where the time during which the fingertip is thereabove within the predetermined period is the longest. In this way, it is possible to automatically enlarge and display the operation image which is estimated to be most desired by the user to operate while reducing the number of operation images to be enlarged.

The control portion 5 may enlarge and display, on the display panel 21, a plurality of operation images displayed below the track within the predetermined period. In this way, it is possible to enlarge and display only the operation image above which the fingertip passes and which the user is highly likely to touch among the operation images within the display screen.

The control portion 5 may also enlarge and display, on the display panel 21, the operation images adjacent to the operation image where the time during which the fingertip is thereabove within the predetermined period is the longest or the operation images adjacent to the operation image displayed below the track within the predetermined period. In this way, the operation image which the user attempts to operate can be included in the operation image enlarged and displayed almost without fail.

As the trembling of the fingertip is faster, it is more difficult to accurately touch the desired operation image. Hence, as the number of times the direction of the movement is switched is increased, the control portion 5 may increase the enlargement rate in the enlargement and display. In this way, it is possible to enlarge the operation image with consideration given to the degree of the trembling of the fingertip. Thus, any user can accurately touch the desired operation image.

The control portion 5 may determine the swing range B of the fingertip based on the track, and may enlarge and display, on the display panel 21, the operation image such that the width of the operation image after being enlarged and displayed in the up/down direction is wider than the width of the swing range B in the up/down direction and that the width of the operation image after being enlarged and displayed in the left/right direction is wider than the width of the swing range B in the left/right direction. In this way, the operation image can be enlarged so as to become larger than the range of the trembling of the fingertip. Hence, even when the fingertip trembles, it is possible to touch the desired operation image by lowering the finger.

The control portion 5 detects that the fingertip enters a separated state in which the fingertip is a longer distance away from the surface of the touch panel portion 22 than a distance which is determined to be in the close state, and when a predetermined cancellation time has elapsed since the separated state is entered, the display size of the operation image enlarged and displayed is returned to the normal size. In this way, even when the operation image is enlarged and displayed unintentionally, it is possible to automatically cancel the enlargement and display by separating the finger form the touch panel portion 22.

The touch panel portion 22 includes the capacitive type sensor panel 22a. Without addition of a circuit and a sensor that are special, it is possible to detect that the fingertip approaches the surface of the touch panel and to reduce the manufacturing cost.

An image forming apparatus (the multifunctional peripheral 100) includes the display input device 1 described above. Even the user who has a trembling fingertip can easily perform settings on the image forming apparatus. Thus, it is possible to provide the image forming apparatus that the user who has a trembling fingertip can easily use.

Although the embodiment of the present disclosure is described, the scope of the present disclosure is not limited to the embodiment, and various variations can be practiced without departing from the spirit of the disclosure.

Although in the above discussion, the display input device included in the image forming apparatus is described, the display input device of the present application is not limited to devices for image forming apparatuses. Portable devices (terminals), such as a smart phone and a tablet type computer, that include a touch panel and a display panel are types of display input device in the present application.

What is claimed is:

1. A display input device comprising:
   a display panel that displays an operation image for setting;
   a touch panel portion that is provided above the display panel and that detects a coordinate of a fingertip in a close state in which a surface is not touched but the fingertip approaches the surface and a coordinate of an actual touch position; and
   a control portion that recognizes a position of the fingertip in the close state and a track of the fingertip in the close state, determines, based on the recognized track, whether or not in the close state, the fingertip is in a swing state in which the fingertip swings and enlarges and displays, on the display panel, one or a plurality of the operation images displayed below the track when the fingertip is determined to be in the swing state;
   wherein the control portion determines a swing range of the fingertip based on the track and enlarges and displays, on the display panel, the operation image such that a width of the operation image after being enlarged and displayed in an up/down direction is wider than a width of the swing range in the up/down direction and that a width of the operation image after being enlarged and displayed in a left/right direction is wider than a width of the swing range in the left/right direction,
   wherein the swing state comprises a trembling or at least one switching of direction of movement.

2. The display input device according to claim 1, wherein when a number of times a direction of movement of the fingertip is switched in the close state within a predetermined determination period is more than a predetermined reference number, the control portion determines that the fingertip is in the swing state.

3. The display input device according to claim 2, wherein as the number of times the direction of the movement of the fingertip is switched is increased, the control portion increases an enlargement rate in the enlargement and display.

4. The display input device according to claim 3, further comprising:
   a storage portion that stores switching number data in which the enlargement rate corresponding to the number of times the switching is performed is determined
   wherein the switching number data is defined such that as the number of times the switching is performed is increased, the enlargement rate is increased, and
   the control portion determines the enlargement rate based on the actually counted number of times the switching is performed and the switching number data.

5. The display input device according to claim 1, wherein when the fingertip is determined to be in the swing state such that the operation image is enlarged and displayed, the control portion enlarges and displays, on the display panel, the operation image where a time during which the fingertip is thereabove within a predetermined period is the longest.

6. The display input device according to claim 5, wherein the control portion enlarges and displays, on the display panel, the operation image adjacent to the operation image where the time during which the fingertip is thereabove within the predetermined period is the longest.

7. The display input device according to claim 1, wherein when the fingertip is determined to be in the swing state such that the operation image is enlarged and displayed, the control portion enlarges and displays, on the display panel, a plurality of the operation images displayed below the track within a predetermined period.

8. The display input device according to claim 5, wherein the control portion enlarges and displays, on the display panel, the operation images adjacent to the operation images displayed below the track within the predetermined period.

9. The display input device according to claim 1, further comprising:
a storage portion that stores enlargement rate adjustment data in which an adjustment value for a number of times a direction of movement of the fingertip is switched in the close state within a predetermined period is determined,
wherein in the enlargement rate adjustment data, as the number of times the switching is performed is increased, a higher adjustment value is defined and
the control portion adds the adjustment value obtained based on the enlargement rate adjustment data to a magnification determined based on the swing range so as to determine an enlargement rate which is applied to the enlargement and display.

10. The display input device according to claim 1, wherein the control portion detects that the fingertip enters a separated state in which the fingertip is a longer distance away from a surface of the touch panel portion than a distance which is determined to be in the close state, and returns, when a predetermined cancellation time has elapsed since the separated state is entered, a display size of the operation image enlarged and displayed to a normal size.

11. The display input device according to claim 1, wherein the touch panel portion includes a capacitive type sensor panel.

12. A method of controlling a display input device, the method comprising:
displaying an operation image for setting;
detecting a coordinate of a fingertip in a close state in which a surface is not touched but the fingertip approaches the surface and a coordinate of an actual touch position;
recognizing a position of the fingertip in the close state and a track of the fingertip in the close state,
determining, based on the recognized track, whether or not in the close state, the fingertip is in a swing state in which the fingertip swings;
enlarging and displaying one or a plurality of the operation images displayed below the track when the fingertip is determined to be in the swing state;
determining a swing range of the fingertip based on the track; and
enlarging the operation image such that a width of the operation image after being enlarged in an up/down direction is wider than a width of the swing range in the up/down direction and that a width of the operation image after being enlarged in a left/right direction is wider than a width of the swing range in the left/right direction,
wherein the swing state comprises a trembling or at least one switching of direction of movement.

* * * * *